Figure 1:
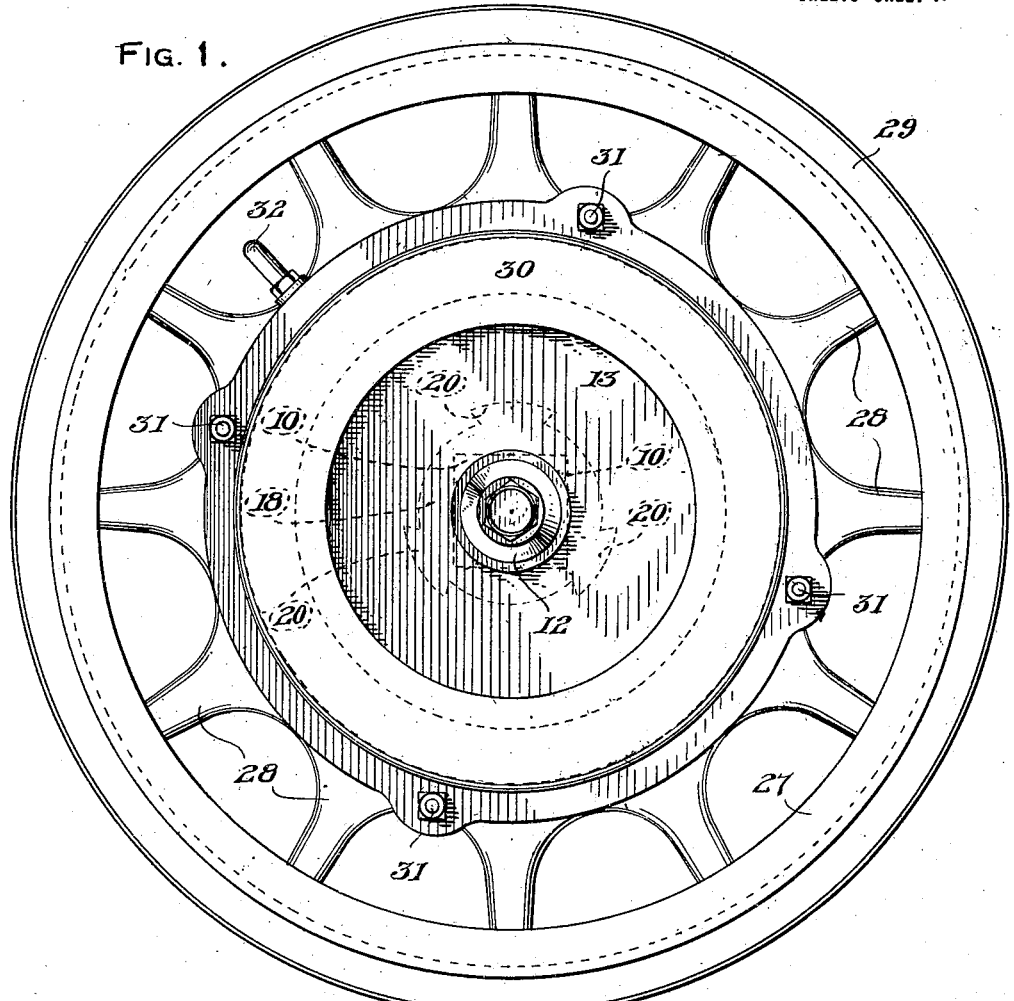

J. MITROSKY AND J. BOGDAN.
CUSHION WHEEL.
APPLICATION FILED JULY 22, 1919.

1,369,181.

Patented Feb. 22, 1921.
2 SHEETS—SHEET 1.

Inventors
J. Bogdan
J. Mitrosky

By A. M. Wilson
Attorney

J. MITROSKY AND J. BOGDAN.
CUSHION WHEEL.
APPLICATION FILED JULY 22, 1919
1,369,181
Patented Feb. 22, 1921.
2 SHEETS—SHEET 2.
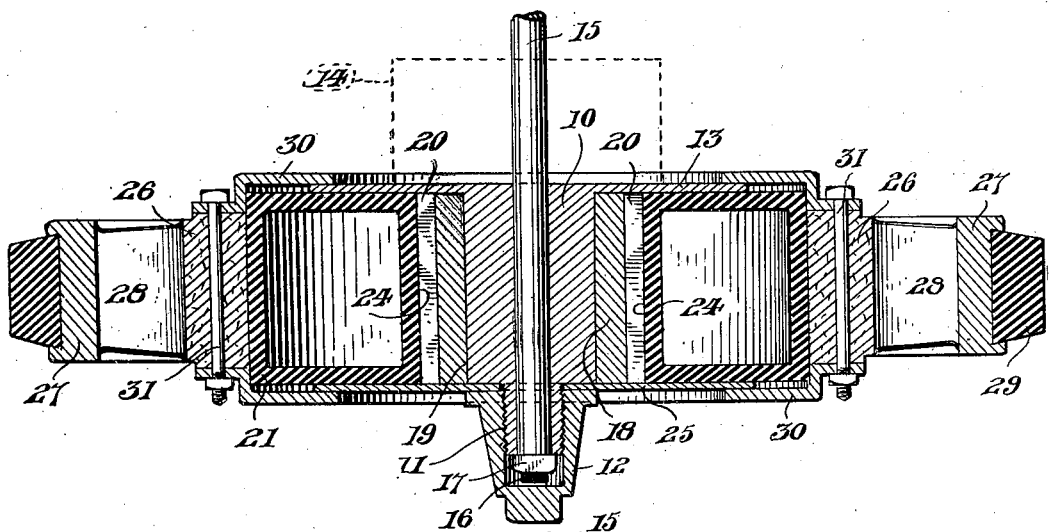
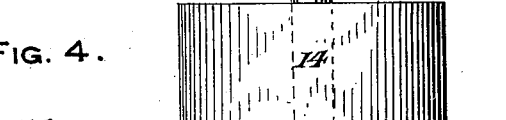
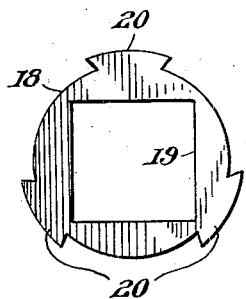
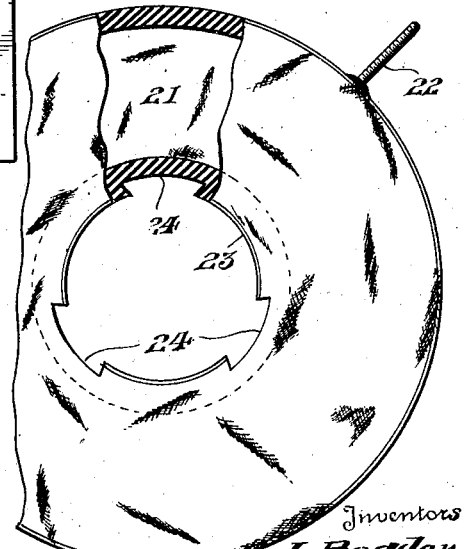
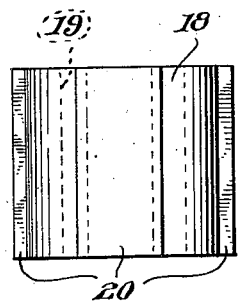
Inventors
J. Bogdan
J. Mitrosky
By A. M. Wilson
Attorney

UNITED STATES PATENT OFFICE.

JOHN MITROSKY AND JOHN BOGDAN, OF PERTH AMBOY, NEW JERSEY; SAID MITROSKY ASSIGNOR TO SAID BOGDAN.

CUSHION-WHEEL.

1,369,181.  Specification of Letters Patent.  Patented Feb. 22, 1921.

Application filed July 22, 1919. Serial No. 312,562.

*To all whom it may concern:*

Be it known that we, (1) JOHN MITROSKY and (2) JOHN BOGDAN, (1) a citizen of Czechoslovakia, (having declared his intention to become a citizen of the United States of America,) and (2) a citizen of the United States of America, residing at Perth Amboy, in the county of Middlesex and State of New Jersey, have invented certain new and useful Improvements in Cushion-Wheels, of which the following is a specification.

The primary object of the present invention resides in the provision of a cushion wheel wherein the main cushioning element is arranged in proximity of the wheel hub so that the major portion of the shocks will be absorbed by the wheel adjacent the hub portion thereof instead of at the periphery in the usual form of cushion wheel.

A further object of the invention is to provide a cushion wheel embodying inner and outer rim members connected by relatively short spokes with a pneumatic tire interposed between the inner rim member and the wheel hub with means for locking the pneumatic tire to the wheel hub.

With the above and other objects in view, the invention consists in the novel form, combination and arrangement of parts hereinafter fully described in connection with the accompanying drawings and in which like reference characters designate corresponding parts throughout the several views.

Figure 2:
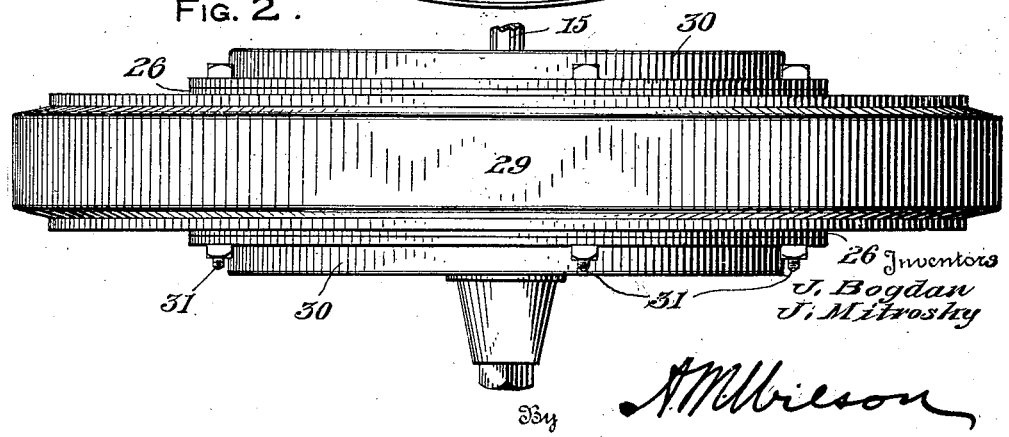

In the drawings,

Figure 1 is a side elevational view of a cushion wheel constructed in accordance with the present invention, Fig. 2 is an edge elevational view of the same, Fig. 3 is a central transverse sectional view of the wheel shown in Fig. 1 illustrating the pneumatic tire arranged adjacent the wheel hub with the inner and outer rims spaced outwardly thereof.

Fig. 4 is a plan view of the detachable wheel hub removed from the wheel, showing the brake band attached thereto, Fig. 5 is an end elevational view of the hub block removed from the wheel and employed to lock the pneumatic tire to the wheel hub, Fig. 6 is a side elevational view of the hub block and Fig. 7 is a side elevational view, partly broken away and partly in section, of the pneumatic tire illustrating the dove-tail seats formed upon the inner wall for interlocking engagement with the hub block.

In cushion wheels, where the pneumatic tire is carried by the tread portion thereof, it has been found that the wear and tear upon the pneumatic tire has been exceedingly great thus materially increasing the cost in maintaining the motor vehicle in proper running condition. To substitute a solid rubber tire for a pneumatic one upon the tread of a motor vehicle wheel does not provide the easy riding and cushion properties that are afforded by a pneumatic tire, and with these objects in view, the present invention embodies the combination of the two devices wherein the solid rubber tire is exposed at the tread portion of a wheel while the pneumatic tire for the wheel is arranged inwardly of the tread portion and adjacent the hub so that a greater portion of the shocks will be absorbed by the wheel adjacent the hub thereof thus decreasing the wear upon the solid tread tire and prolonging the life thereof.

Describing the invention more in detail, there is illustrated a cushion wheel embodying a hub portion 10 rectangular in cross section and being provided upon one end thereof with a reduced threaded portion 11 adapted for the reception of a hub cap 12, the other end of the hub 10 carrying a circular radial disk 13 preferably formed integral therewith and to which a brake band 14 may be connected, the hub having a central opening therein for the reception of the axle 15 having the projecting end thereof threaded as at 16 for the reception of the nut 17 engaging the end of the hub portion 11 for purposes of retaining the hub thereon, the projecting threaded end of the axle being shown in Fig. 4.

A pneumatic tire and hub locking block is shown in Figs. 5 and 6 and includes a cylindrical body member 18 having a rectangular central opening 19 adapted for free sliding reception on the rectangular portion of the hub 10 while the outer cylindrical face of the body member 18 is provided with dove-tail-shaped projections 20 for purposes presently to appear.

The pneumatic tire shown in Fig. 7 is adapted to be positioned upon the hub block 18 and includes a rubber body portion 21 preferably rectangular in cross section as shown in Fig. 3 and being provided in the outer wall thereof with an inflating tube 22, the inner wall 23 thereof being provided with dove-tail-shaped sockets 24, equal in number to the like projections 20 upon the hub block 18 for interlocking sliding reception thereon as illustrated in Fig. 3. The inner side of the pneumatic tire 21 engages the hub disk while the outer side of the pneumatic tire is engaged by a removable disk 25 arranged concentric with the hub 10 and held in position thereon by being clamped between the outer end of the hub 10 and the hub cap 12.

Tread rim sections are associated with the outer surface of the pneumatic tire 21 and embody a unitary structure including an inner rim 26 and an outer rim 27 rigidly connected by the relatively short substantial spokes 28 while a solid cushion tire 29 is mounted upon the tread portion of the outer rim 27 for engagement with the ground. The outer rim structure is retained in position upon the pneumatic tire by the side plates 30 shown more clearly in Figs. 1 and 3, the outer edges thereof lying juxtaposed to the outer sides of the inner rim 26 and secured thereto by transverse bolts 31 extending completely through the inner rim section 26 while the inwardly projecting sides of the plates 30 overlap and have free sliding engagement with the disks 13 and 25.

The assembling of the cushion wheel will at once be apparent from the above detailed description of the construction thereof, it being noted as shown in Fig. 1 that the air tube 22 of the pneumatic tire 21 projects through the inner rim 26 to be covered by a cap 32. The pneumatic tire 21 is retained in position on the hub block 18 by the interlocking connection 20 and 24 when combined with the side plates 13 and 25 while the rim structure is retained in position on the pneumatic tire by the side plates 30 having telescopic connections with the plates 13 and 25. The pneumatic tire receives the major portion of the shocks incident to the traveling movement of the wheel while the solid tire 29 affords a cushion engagement with the road bed.

It is to be understood that various changes may be made in the details of construction as well as substitution of parts, it also being contemplated to employ a tire shoe and inner tube to be used in lieu of the pneumatic tire 30 while a modified form of hub, hub block and rim structure may be employed that will fall within the scope of the subject matter claimed.

What is claimed as new is:—

1. A wheel of the class described comprising an inner hub section, rectangular in cross section, an outer hub section having a rectangular bore receiving the inner section, the outer hub section being cylindrical in cross section and having a plurality of spaced parallel dove-tail-shaped projections on the periphery thereof, a pneumatic tire having a relatively thick inner wall provided with spaced parallel dove-tailed shaped grooves extending transversely thereof adapted to receive the projections on the outer hub section to interlock the hub and pneumatic tire, a disk flatly engaging the ends of the hub sections and side wall of the pneumatic tire for retaining the pneumatic tire in position on the hub and a tread supported on the tire.

2. A wheel of the type described comprising a cylindrical hub section, a plurality of spaced parallel dove-tail-shaped projections upon the periphery thereof, the outer faces of the projections being curved and concentric with the periphery of the hub section, a pneumatic tire having a relatively thick inner wall provided with spaced parallel dove-tail-shaped grooves extending transversely thereof with the bottoms of the grooves curved and concentric with the inner wall of the tire, the projections and grooves being of equal dimensions with the projections interlockingly received in said grooves, means for retaining the tire on the hub, and a tread supported on the tire.

In testimony whereof we affix our signatures.

JOHN MITROSKY.
JOHN BOGDAN.